United States Patent
Lim et al.

(10) Patent No.: US 8,428,647 B2
(45) Date of Patent: Apr. 23, 2013

(54) VERIFYING AND IDENTIFYING INCOMING PBX CALLS ON MOBILE DEVICES

(75) Inventors: Miranda Bing Ying Lim, Nepean (CA); Gibran Siddique, Toronto (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 13/455,672

(22) Filed: Apr. 25, 2012

(65) Prior Publication Data
US 2012/0208513 A1    Aug. 16, 2012

Related U.S. Application Data

(63) Continuation of application No. 12/693,306, filed on Jan. 25, 2010, now Pat. No. 8,190,201.

(51) Int. Cl.
*H04M 1/00* (2006.01)
(52) U.S. Cl.
USPC ............ 455/555; 455/554.1; 455/414.1; 379/198; 379/231; 379/234
(58) Field of Classification Search .......... 455/554.1, 455/555, 414.1, 412.1, 412.2, 415, 417; 379/198, 379/231, 234
See application file for complete search history.

(56) References Cited

U.S. PATENT DOCUMENTS

| | | | |
|---|---|---|---|
| 5,070,521 A | 12/1991 | Warner et al. | |
| 5,329,578 A | 7/1994 | Brennan et al. | |
| 5,930,700 A | 7/1999 | Pepper et al. | |
| 6,038,293 A | 3/2000 | McNerney et al. | |
| 6,510,217 B1 | 1/2003 | Welch et al. | |
| 6,771,755 B1 | 8/2004 | Simpson | |
| 7,263,179 B2 | 8/2007 | Sammon et al. | |
| 8,295,827 B2 * | 10/2012 | Ray et al. ............ | 455/426.1 |
| 2001/0046287 A1 | 11/2001 | Hoefig | |
| 2007/0190975 A1 | 8/2007 | Eonnet | |

(Continued)

FOREIGN PATENT DOCUMENTS

| | | |
|---|---|---|
| DE | 102006060967 A1 | 9/2007 |
| GB | 2397731 A | 7/2004 |
| KR | 20030056646 A | 7/2003 |

OTHER PUBLICATIONS

Extended European Search report mailed Jul. 2, 2010; in corresponding application No. 10151561.7.

(Continued)

*Primary Examiner* — Vladimir Magloire
(74) *Attorney, Agent, or Firm* — Novak Druce Connolly Bove + Quigg LLP

(57) ABSTRACT

Aspects relate to provision of enterprise call capabilities to mobile devices. For example, a mobile device can indicate, over a data channel, that a PBX is to make a call on its behalf to a called party. The PBX can call back the mobile device, call the called party, and bridge those call legs to establish the call. The mobile device can employ mechanisms that a particular incoming call is made by the PBX. These mechanisms can include using ANI information, sending, and receiving audible verification codes over the voice channel established after answering the incoming call. The verification codes can be selected based on different behaviors of the mobile devices and the network or networks used by the device(s).

19 Claims, 11 Drawing Sheets

U.S. PATENT DOCUMENTS

2007/0223401 A1    9/2007    Chatterjee et al.
2007/0248221 A1    10/2007    Chatterjee et al.
2008/0139230 A1    6/2008    Mottes
2008/0253443 A1    10/2008    Aharon
2009/0181648 A1    7/2009    Bao et al.

OTHER PUBLICATIONS

Extended European Search report mailed Jul. 19, 2010; in corresponding application No. 09179101.2.

* cited by examiner

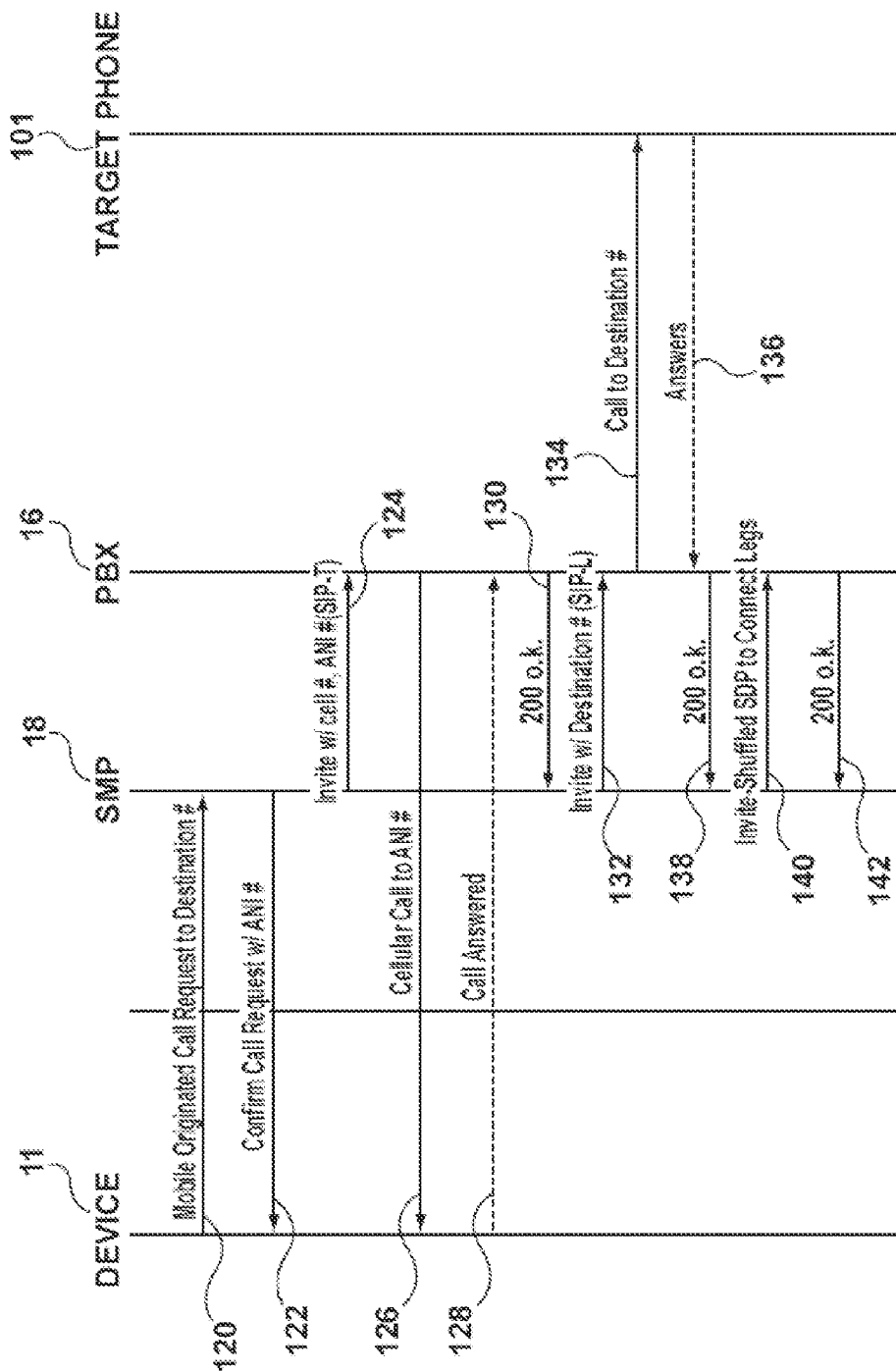

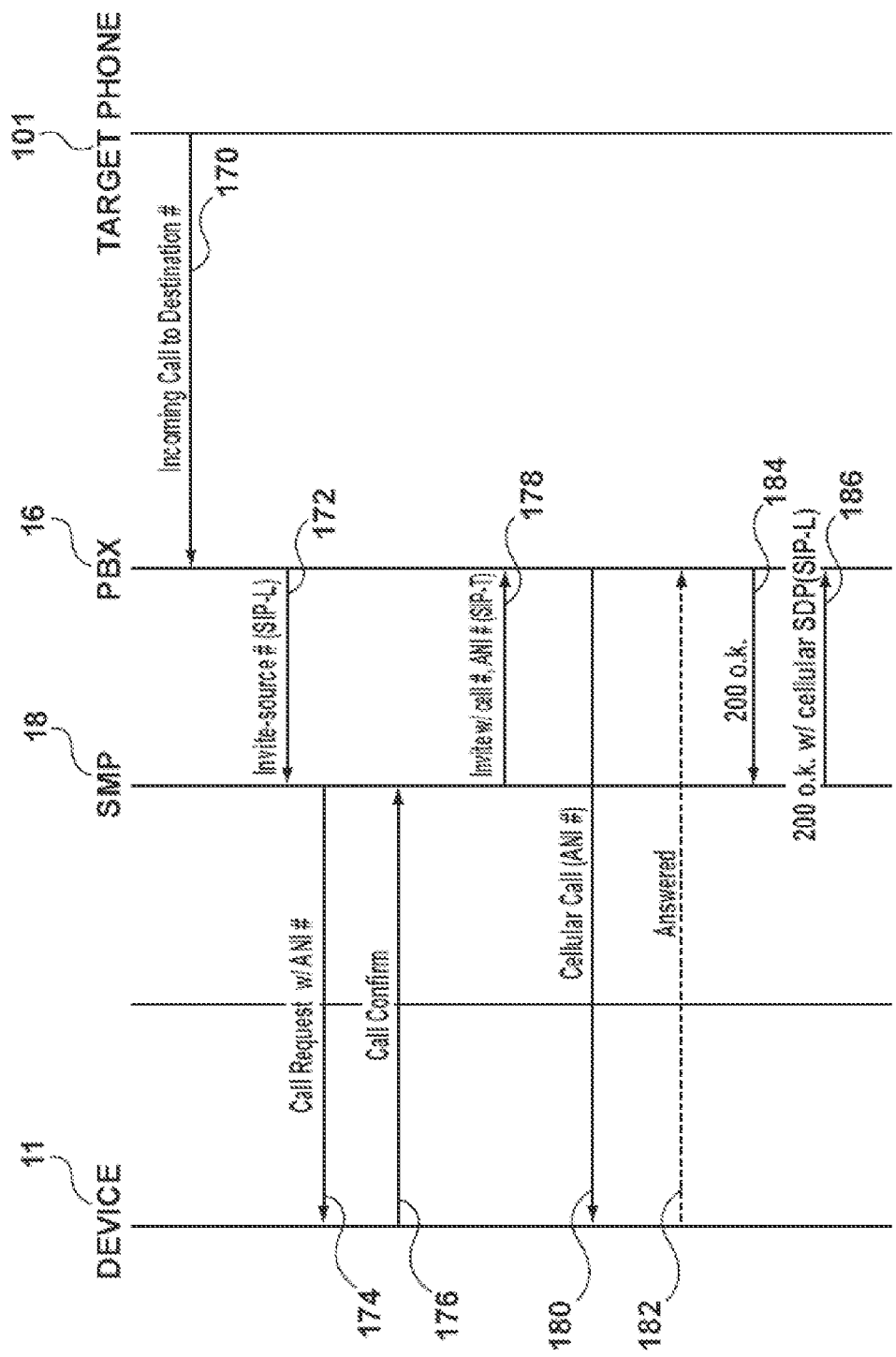

US 8,428,647 B2

VERIFYING AND IDENTIFYING INCOMING PBX CALLS ON MOBILE DEVICES

CROSS-REFERENCE TO RELATED APPLICATION

The present application is a continuation of U.S. patent application Ser. No. 12/693,306, filed Jan. 25, 2010, the contents of which are fully incorporated by reference herein.

BACKGROUND

1. Field

The present application relates to voice telephony on mobile devices, and in some aspects, providing enterprise telephony capabilities on mobile devices.

2. Related Art

In many offices, desktop wired phones are often connected to a system that provides Private Branch eXchange (PBX) type services. It is desirable to be able to use mobile devices similarly to such wired phones. Also, it would be desirable to be able to implement other usage models directed more particularly to mobile devices. For example, tariff structures for mobile devices often differ from those of wired telephony. Also, a mobile device, as it moves from geography to geography, may have different capabilities. For example, in some areas, the device may have both voice and data channels available, while in other circumstances, a data channel may be unavailable. In some networks, Caller ID or Automatic Number Identification (ANI) information may be unavailable, or not reliably available.

BRIEF DESCRIPTION OF THE DRAWINGS

Reference will now be made, by way of example, to the accompanying drawings which show example embodiments of the present application, and in which:

FIG. 6B is a signaling diagram generally indicating how mobile-originated, PBX-initiated, calls are processed by the network of FIG. 5;

FIG. 7B is a signaling diagram generally indicating how mobile-terminated, PBX-initiated calls are processed by the network of FIG. 5;

DESCRIPTION

In general, the present application relates to the control and management of communications. In one exemplary aspect, the present application relates to a telephony method for implementation on a mobile device. The telephony method comprises receiving an incoming voice call over a voice channel on the mobile device. The incoming voice call may be from a PBX (or more generally, a platform providing enterprise communication capabilities to mobile devices). The method includes answering the voice call and sending, from the mobile device, a verification code comprising a series of audible tones, when identifying information for the voice call being received is unavailable to the mobile device. The method allows the voice call to proceed responsive to receiving, at the mobile device, a verification code over the voice channel within a time limit. The method can be employed, for example, where the mobile device has signaled to a PBX that it wants the PBX to make a call on its behalf. The PBX can make the call, and when the called party has accepted the call, the PBX can call the mobile device, and bridge both call legs, establishing the call. These example is by way of explanation, rather than limitation.

Although reference may be made to "calls" in the description of example embodiments below, it will be appreciated that the described systems and methods are applicable to session-based communications in general and not limited to voice calls. Other aspects of the present application will be apparent to those of ordinary skill in the art from a review of the following detailed description in conjunction with the drawings. Embodiments of the present application are not limited to any particular operating system, mobile device architecture, server architecture, or computer programming language.

Figure 1:
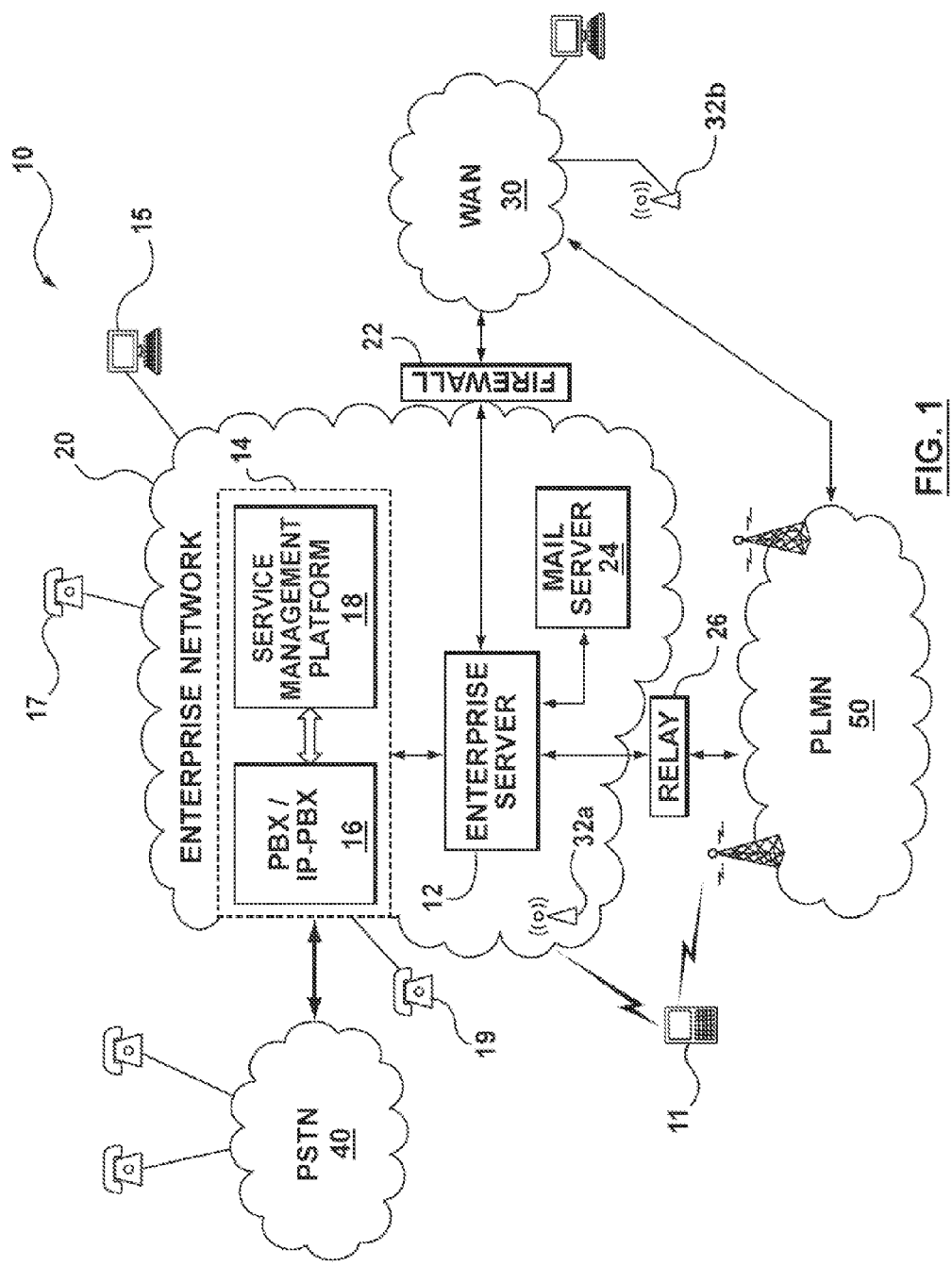
FIG. 1 shows, in block diagram form, an example system for managing enterprise-related mobile calls, including an enterprise communications platform.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform (server), generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
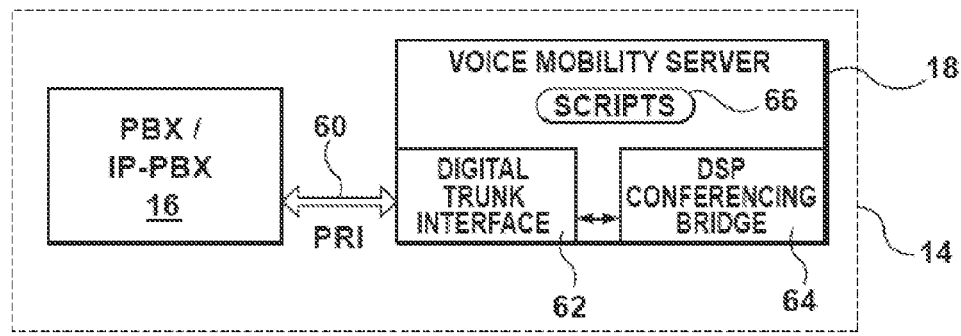
FIG. 2 shows, in block diagram form, further details of an embodiment of the enterprise communications platform.
Figure 3:
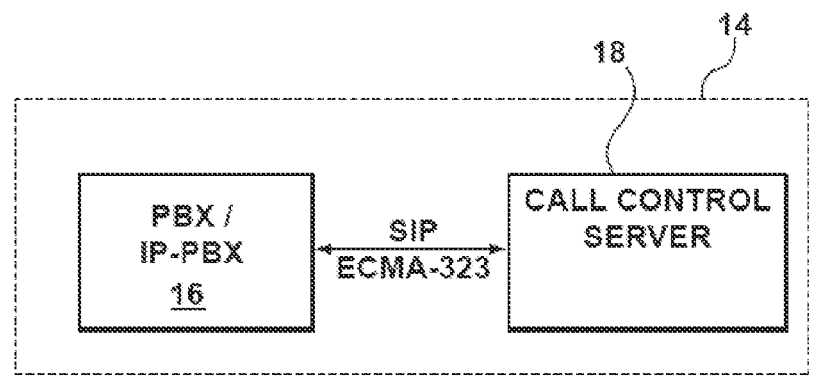
FIG. 3 shows another embodiment of the enterprise communications platform.
Figure 4:
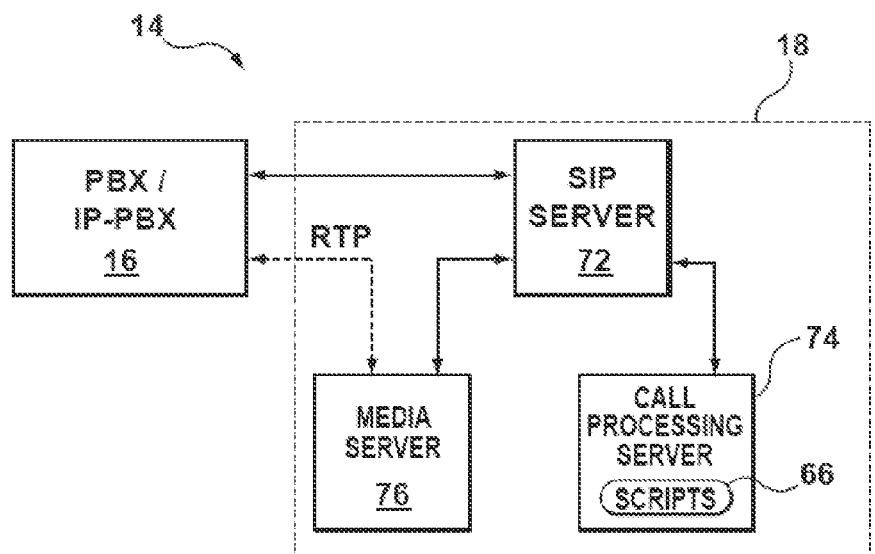
FIG. 4 shows yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5:
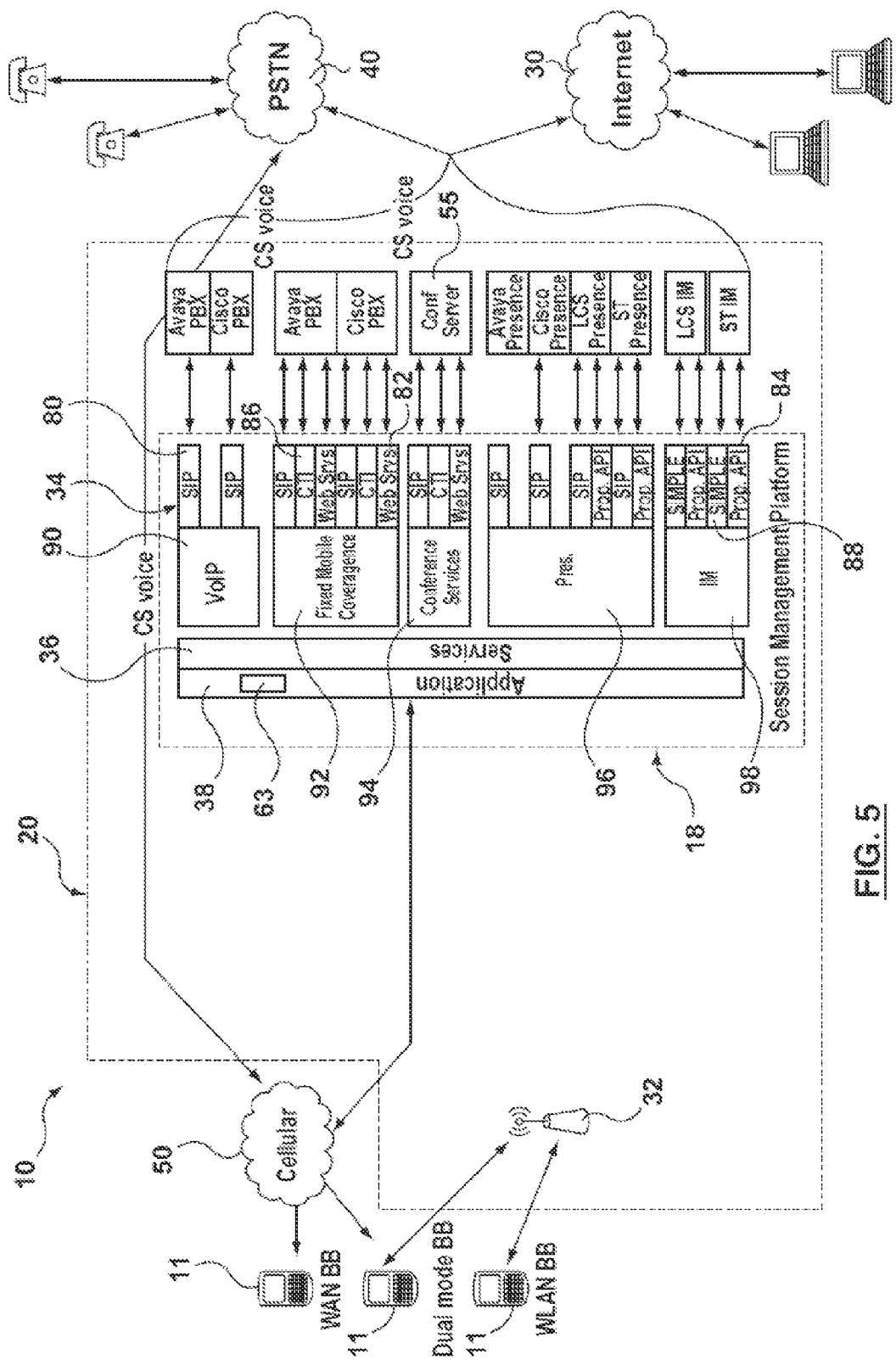
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Turning now to FIGS. 6A through 7B, the general operation of the system 10 using SIP 80 as the signaling protocol will be discussed, although it is recognized that the present system is not limited to the processes discussed herein. The signaling descriptions that follow are based on Third Party Call Control architecture, such as that illustrated in FIG. 3 or 5. It will be appreciated that similar but slightly modified signaling may be used in a First Party Call Control architecture, wherein the PBX 16 will pass media through to the SMP 18 for direct media handling by the SMP 18. Variations in the signaling to adapt to various architectures will be appreciated by those ordinarily skilled in the art.

Figure 6A:
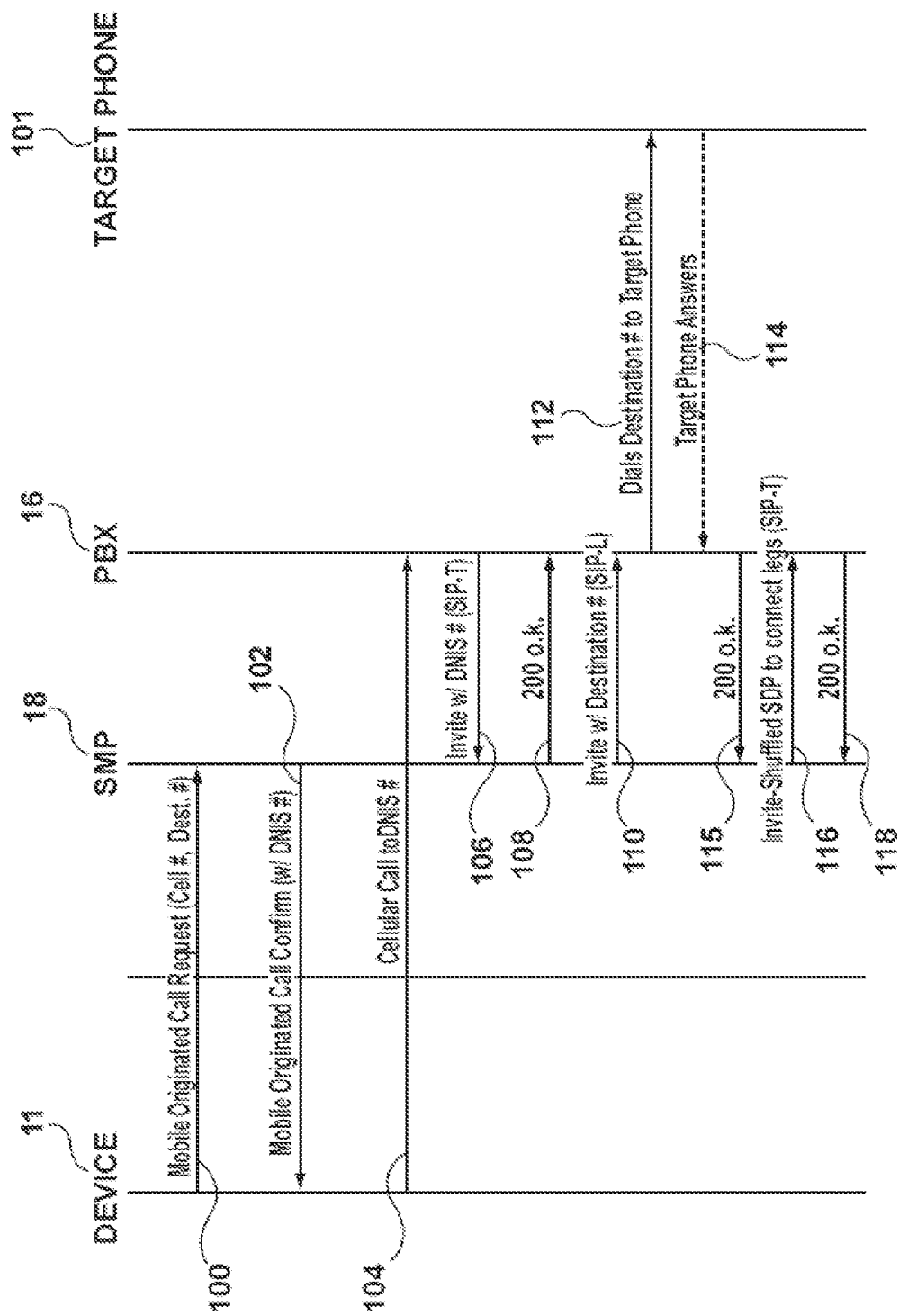
FIG. 6A is a signaling diagram generally indicating how mobile-originated, mobile-initiated calls are processed by the network of FIG. 5.

FIG. 6A provides a signaling diagram for a call originating from one of the mobile devices 11 to a target phone 101 connected to a Private Branch Exchange Server or PBX 16 provided within the enterprise network 20. First, the device 11 sends a mobile originated call request with its cellular number and the destination number of the target phone 101 to the SMP 18 (block 100). In some embodiments, the mobile originated call request may be sent via the WLAN through the enterprise server 12. In another embodiment, the call request may be sent via the PLMN/PSTN through the PBX 16, for example as an SMS message or using another messaging operation. The SMP 18 confirms the call request by sending the DNIS number to the device 11 (block 102). Next, the device 11 makes a cellular call using the DNIS number, which is received by the PBX 16 (block 104). As the DNIS has been configured in the PBX 16 to be routed to the SMP 18 via SIP-T, in response to the incoming call, the PBX 16 sends an invite over SIP-T with the DNIS number to the SMP 18 (block 106). The SMP 18 matches the incoming call with the expected call from the mobile, and if correct, acknowledges the invite by sending a 200 OK signal to the PBX 16, indicating that the mobile call leg is established (block 108).

The SMP 18 then sets up the outgoing call leg to the destination. It does this by sending an invite over SIP-L to the PBX 16 with the destination number of the target phone (block 110). SIP-L is used so that the call can be correctly attributed to the individual within the organization within any call records that are being maintained by the PBX 16. When the invite is received, the PBX 16 dials the destination number to the target phone 101 (block 112), and the target phone 101 answers the call (block 114). When the target phone 101 is answered, the PBX 16 sends a 200 OK signal to the SMP 18 indicating that the target phone 101 is ready to receive data (block 115). The SMP 18 then sends an invite over SIP-T to the PBX 16 and shuffles the SDP (Session Description Protocol, as known to those of ordinary skill in the art) to connect the call legs (block 116). When the call legs are connected, the PBX 16 sends a second 200 OK signal to the SMP 18 (block 118), and the users of the device 11 and target phone 101 can communicate with each other.

Note that between the cellular call leg being established and the outgoing call leg being answered, the mobile user hears ringing tones. These ringing tones may be provided by the PBX 16 using the presentation of early media from the outgoing call leg, or they may be generated locally on the device 11 if early media is not available. In the latter case, it is desirable to localize the ringing tone to match the tone normally heard with a call through the PBX 16.

The above description is known as a "mobile initiated" call, because the SMP 18 provides the mobile device 11 with the DNIS number into which the mobile device 11 has called. Alternatively, the mobile originated call could be "PBX initiated", as shown in FIG. 6B. Specifically, in a PBX-initiated call, upon receipt of the mobile originated call request (block 120), the SMP 18 confirms receipt of the call to the mobile device 11 with an ANI number (block 122), which the mobile device uses to identify the incoming call from the PBX 16. The SMP 18 then sends an invite over SIP-T to the PBX 16 with the cellular number of the device and the ANI number that is attached to the outgoing call (block 124). Upon receipt of the invite, the PBX 16 makes a cellular call to the device 11 (block 126), which is answered by the device (block 128). The device 11 checks the ANI number in the incoming call to confirm if the number is actually from the PBX 16. If the ANI number is stripped for any particular reason, then the device 11 may be configured to answer the call as a regular cellular call, or it may reject the call as unknown. When the device 11 answers the PBX-initiated call, the PBX 16 sends a 200 OK signal to the SMP 18, indicating that the call leg to the device is established (block 130).

In response, the SMP 18 sends an invite over SIP-L with the destination number of the target phone 101 to the PBX 16 (block 132). When the invite is received at the PBX 16, the PBX dials the destination number to the target phone 101 (block 134), the target phone 101 picks up the call (block 136), and a 200 OK signal is sent from the PBX 16 to the SMP 18 (block 138), indicating that the target phone 101 is also ready to receive data. In response to the 200 OK, the SMP 18 sends an invite to the PBX 16, shuffling the SDP to connect the call legs (block 140). Finally, when the call legs are connected, the PBX 16 sends a second 200 OK signal to the SMP 18, and the users of the device 11 and target phone 101 are able to communicate with each other.

In both instances, the SMP 18 is performing third party call control of the two call legs, the PBX 16 remaining in control of the call. The decision of whether to proceed with a mobile-initiated call or a PBX-initiated call can be set by policy. Specifically, the option to select either mobile-initiated or PBX-initiated calls is a feature provided in the SMP 18, and an administrator for the enterprise network 20 can determine which setting to use. For example, in some cases it may be more cost effective for the corporation to utilize PBX-initiated calls rather than mobile-initiated calls, and vice versa. However, it is appreciated that the system 10 is not limited to the above processes.

Figure 7A:
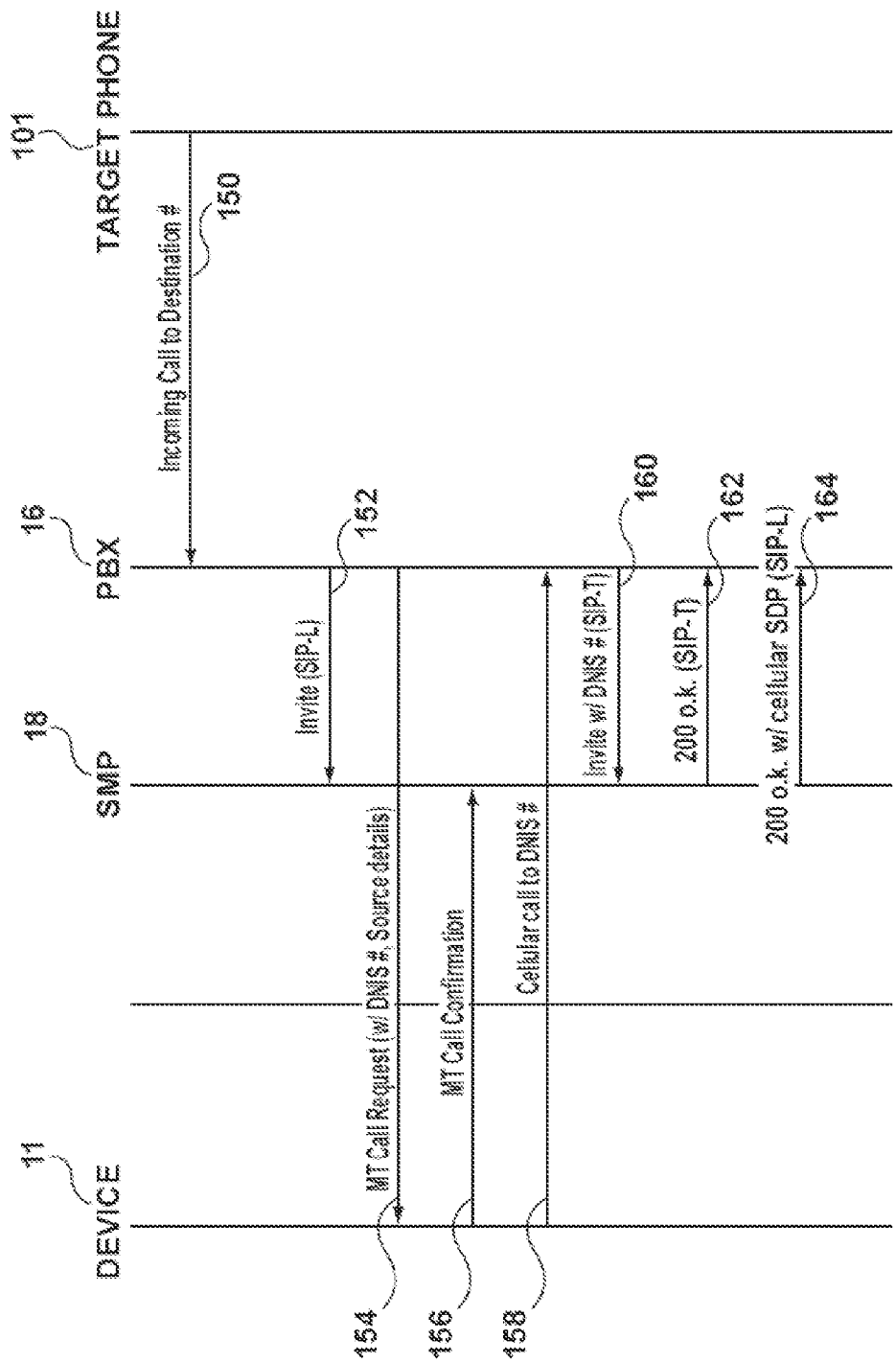
FIG. 7A is a signaling diagram generally indicating how mobile-terminated, mobile-initiated calls are processed by the network of FIG. 5.

FIGS. 7A and 7B are signaling diagrams illustrating a mobile terminated call utilizing SIP 80. Specifically, and for the purposes of this disclosure, the target phone 101 is originating the call. Turning first to FIG. 7A, an incoming call is made from the target phone 101 to the PBX 16 (block 150). When the call is received at the PBX 16, the PBX 16 sends an invite to the SMP 18 over SIP-L (block 152).

In response to the invite, the SMP 18 sends a call request with the DNIS number and source details to the device 11 (block 154), which is confirmed to the SMP (block 156). In addition to confirming the call, the mobile device 11 sends a cellular call to the DNIS number at the PBX 16 (block 158). Again, as the DNIS number is routed in the dialing plans to the SMP 18, upon receipt of the cellular call, the PBX 16 sends an invite over SIP-T to the SMP 18 with the DNIS number (block 160). In response to the invite, a "200 OK" signal is sent over SIP-T from the SMP 18 to the PBX 16, acknowledging that the call leg to the mobile device 11 is established (block 162). Finally, the initial invite (block 152) is acknowledged with the "200 OK" signal with the cellular SDP, at which point the call legs are joined and the target phone 101 and device 11 can communicate with each other on the call.

The diagram shown in FIG. 7A illustrates a "mobile-initiated" call, because, as discussed above with respect to FIGS. 6A and 6B, the SMP 18 presents the mobile device 11 with the DNIS number at the PBX 16 into which to call. However, it is also possible to employ a "PBX-initiated" mobile terminated call, as shown in FIG. 7B, where the PBX 16 sends an incoming call to the device 11 with the ANI number of the target phone 101.

Specifically, similar to the mobile initiated call described above and shown in FIG. 7A, the target phone 101 sends an incoming call to the destination number of the device, which is received at the PBX 16 (block 170). Upon receipt of the call, the PBX 16 sends an invite over SIP-L to the SMP 18 (block 172) with the source number of the target phone 101. In response to the invite, the SMP 18 sends a call request with the source number to the device 11 (block 174), with the ANI number the device should expect in the incoming call, the call request being confirmed by the device (block 176). At this point in the PBX-initiated call, the SMP 18 sends an invite over SIP-T to the PBX 16 with the cellular number and ANI number to use (block 178), prompting the PBX 16 to make a cellular call to the device 11 with the ANI number (block 180), prompting the device to ring. The device 11 answers the call (block 182), and a "200 OK" signal is sent from the PBX 16 to the SMP 18, acknowledging that the cellular call leg to the device 11 is established (block 184). In response, a "200 OK" signal is also sent from the SMP 18 to the PBX 16, acknowledging that the call leg to the target phone 101 is also established (block 186). The SMP 18 shuffles the SDP to connect the call legs, the call legs are joined, and the target phone 101 and device 11 can communicate with each other on the call.

As discussed above with respect to FIGS. 6A and 6B, the SMP 18 typically remains in control of the signaling between the target phone 101 and the mobile device 11 in both the mobile-initiated and PBX-initiated calls. Again, the decision to proceed with a mobile-initiated call or a PBX-initiated call is based on policy and may be set by a system administrator. In some cases, it may be more efficient or cost effective for the administrator to decide that PBX-initiated calls should be used, and in other cases, it may be more efficient or cost effective for mobile-initiated calls to be utilized. As these policy decisions may vary by organization and are not imperative to the scope of the present application, they will not be discussed in further detail.

Figure 8:
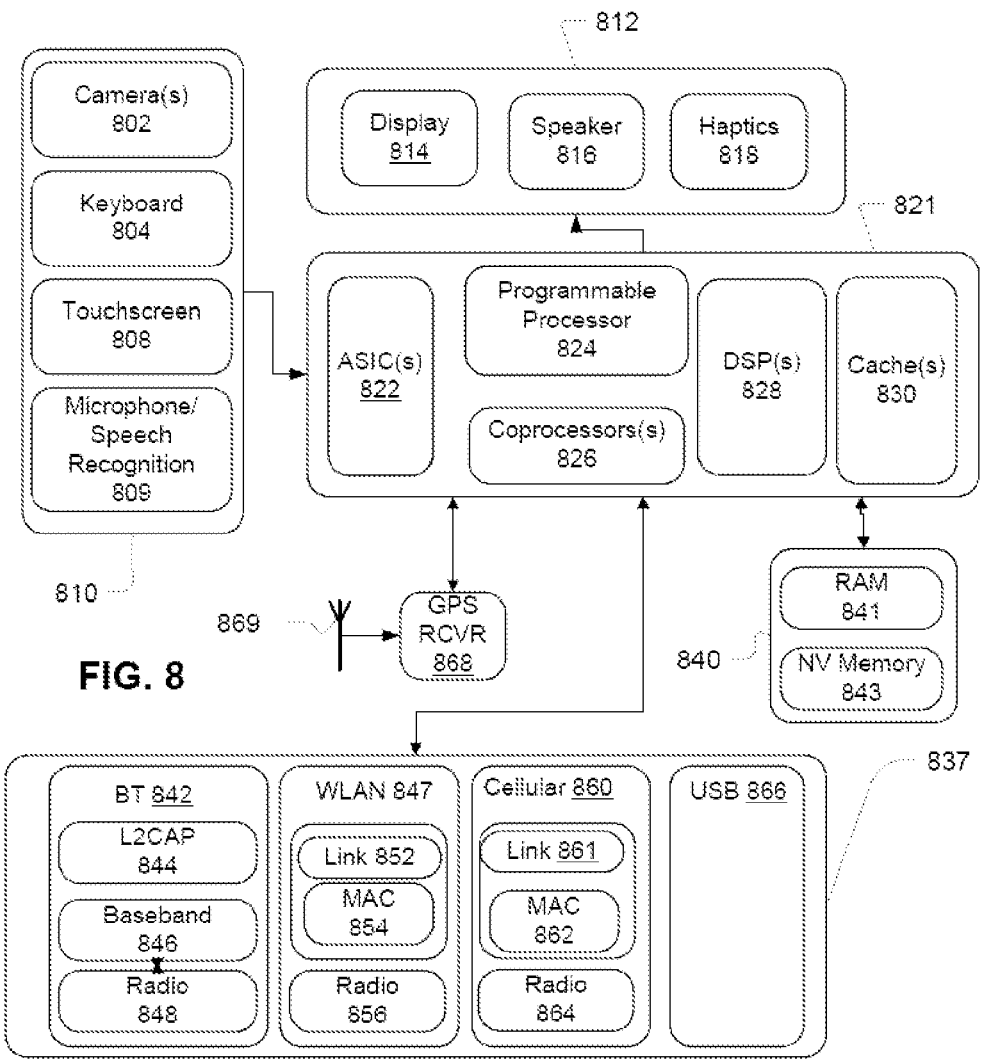
FIG. 8 depicts example of components of an example mobile device.

FIG. 8 depicts example components that can be used in implementing a mobile transceiver device 109 according to the above description. FIG. 8 depicts that a processing module 821 may be composed of a plurality of different processing elements, including one or more ASICs 822, a programmable processor 824, one or more co-processors 826, which each can be fixed function, reconfigurable or programmable, one or more digital signal processors 828. For example, an ASIC or co-processor may be provided for implementing graphics functionality, encryption and decryption, audio filtering, and other such functions that often involve many repetitive, math-intensive steps. Processing module 821 can comprise memory to be used during processing, such as one or more cache memories 830.

Processing module 821 communicates with mass storage 840, which can be composed of a Random Access Memory 841 and of non-volatile memory 843. Non-volatile memory 843 can be implemented with one or more of Flash memory, PROM, EPROM, and so on. Non-volatile memory 843 can be implemented as flash memory, ferromagnetic, phase-change memory, and other non-volatile memory technologies. Non-volatile memory 843 also can store programs, device state, various user information, one or more operating systems, device configuration data, and other data that may need to be accessed persistently.

User input interface 810 can comprise a plurality of different sources of user input, such as a camera 802, a keyboard 804, a touchscreen 806, and a microphone, which can provide input to speech recognition functionality 808. Processing module 821 also can receive input from a GPS receiver 868, which processes signals received from antenna 869. Processing module 821 also can use a variety of network communication protocols, grouped for description purposes here into a communication module 837, which can include a Bluetooth communication stack 842, which comprises a L2CAP layer 844, a baseband 846 and a radio 848. Communications module 837 also can comprise a Wireless Local Area Network (847) interface, which comprises a link layer 852 with a MAC 854, and a radio 856. Communications module 837 also can comprise a cellular broadband data network interface 850, which in turn comprises a link layer 861, with MAC 862. Cellular interface 850 also can comprise a radio for an appropriate frequency spectrum 864. Communications module 837 also can comprise a USB interface 866, to provide wired data communication capability. Other wireless and wired communication technologies also can be provided, and this description is exemplary.

Figure 9:
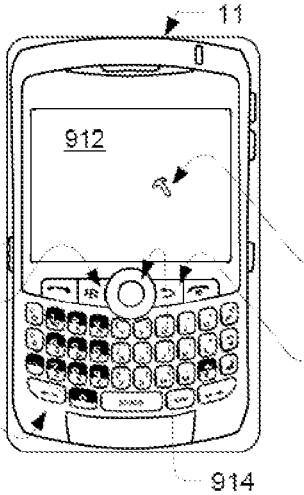
FIG. 9 depicts an example form factor of a mobile device.

Referring to FIG. 9, there is depicted an example of mobile device 11. Mobile device 11 comprises a display 912 and a cursor or view positioning device, here depicted as a trackball 914, which may serve as another input member and is both rotational to provide selection inputs and can also be pressed in a direction generally toward housing to provide another selection input. Trackball 914 permits multi-directional positioning of a selection cursor 918, such that the selection cursor 918 can be moved in an upward direction, in a downward direction and, if desired and/or permitted, in any diagonal direction. The trackball 914 is in this example situated on a front face (not separately numbered) of a housing 920, to enable a user to maneuver the trackball 914 while holding mobile device 11 in one hand.

The mobile device 11 in FIG. 9 also comprises a programmable convenience button 915 to activate a selected application such as, for example, a calendar or calculator. Further, mobile device 11 can include an escape or cancel button 916, a menu or option button 924 and a keyboard 920. Menu or option button 924 loads a menu or list of options on display 912 when pressed. In this example, the escape or cancel button 916, menu option button 924, and keyboard 920 are disposed on the front face of the mobile device housing, while the convenience button 915 is disposed at the side of the housing. This button placement enables a user to operate these buttons while holding mobile device 11 in one hand. The keyboard 920 is, in this example, a standard QWERTY keyboard.

Figure 10:
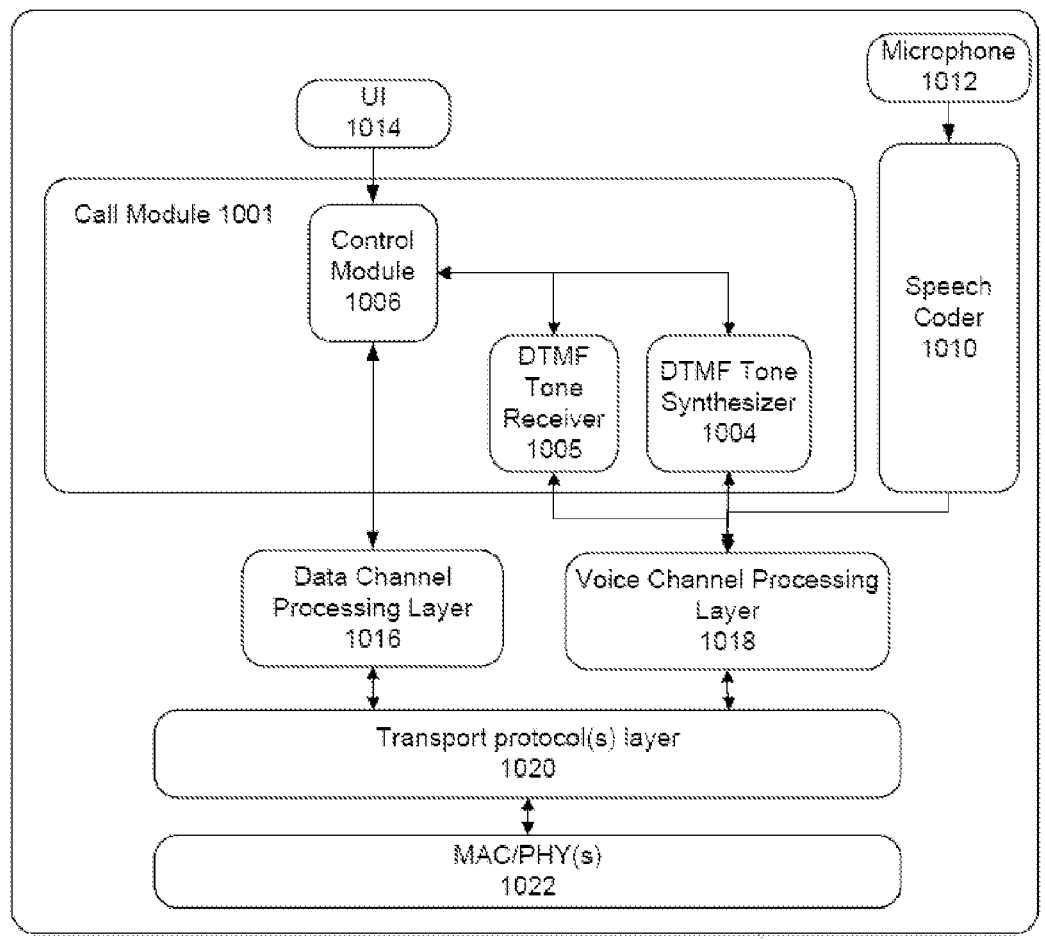
FIG. 10 depicts an example of functional modules that may be provided in a mobile device.

FIG. 10 depicts an example functional module organization of mobile device 11. Call module 1001 identifies a logical organization of modules which can be used for implementing aspects described herein.

The FIG. 10 example of device 11 also depicts a speech coder 1010, which receives input from a microphone 1012, and a tone synthesizer module 1004. Speech coder 1010 and tone synthesizer module 1004 both can provide inputs to a voice channel processing layer 1018. Both data channel processing layer 1016 and voice channel processing layer 1018 can send and receive data to and from transport protocol(s) layer 1020, which in turn communicates with MAC/PHY 1022.

Figure 11:
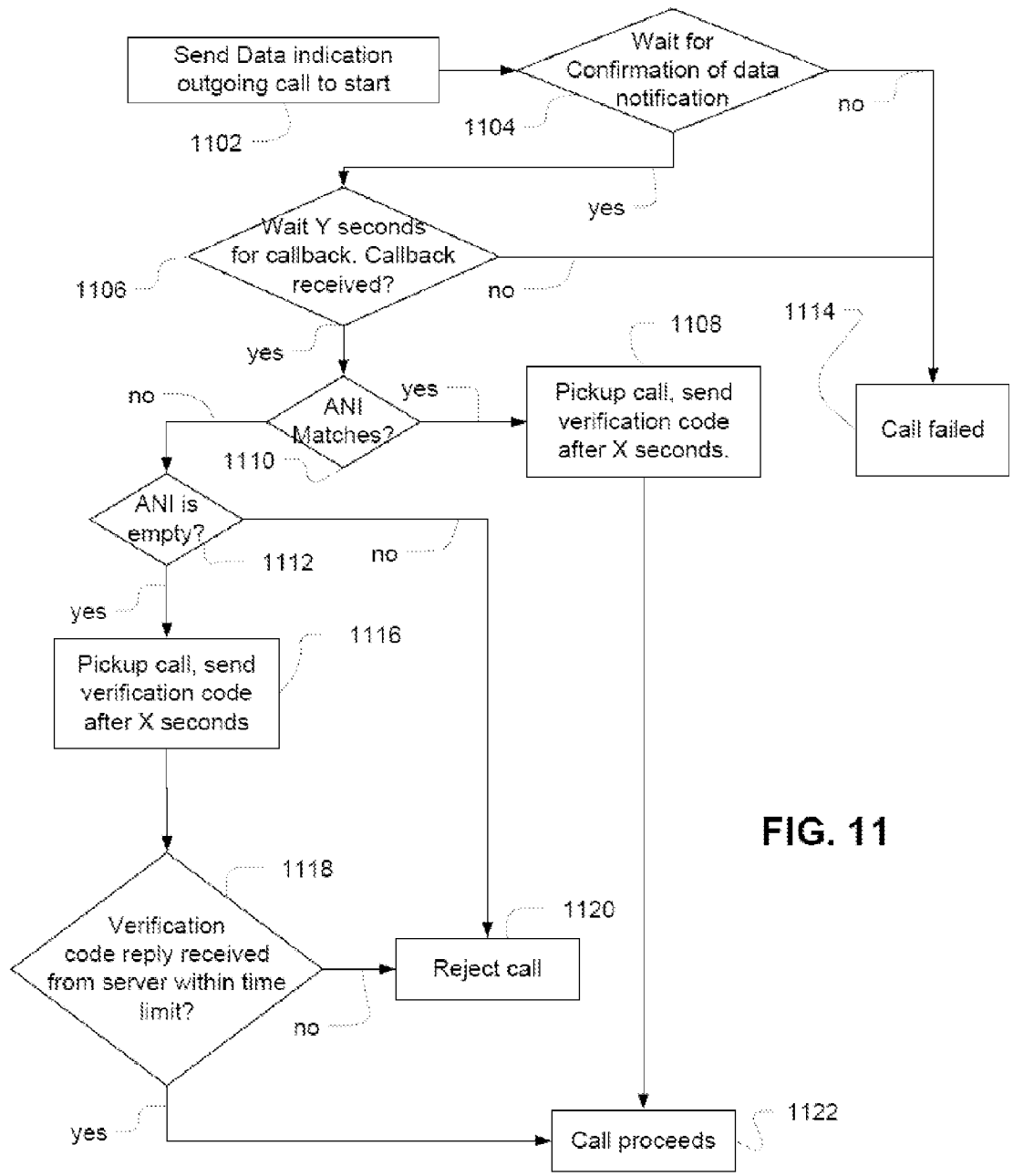
FIG. 11 depicts an example method according to these aspects.
Figure 12:
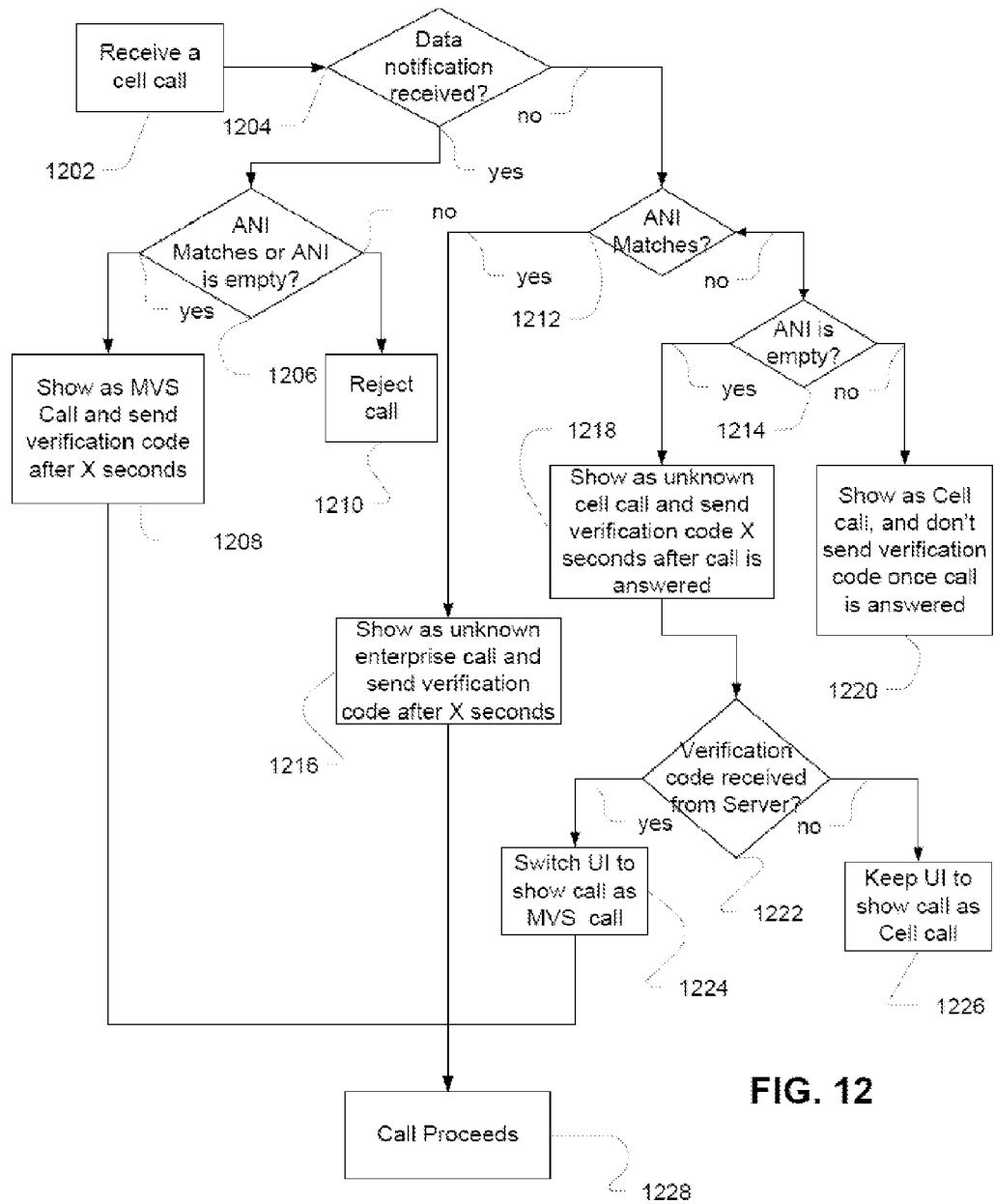
FIG. 12 depicts an example method according to these aspects.

FIGS. 11 and 12 depict example methods for placing and receiving calls, where calls being placed can involve usage of an enterprise voice server (such as a Private Branch eXchange (PBX)).

The example methods of FIGS. 11 and 12 can be best understood in view of the usage models implied by the signaling diagrams shown in FIGS. 6A, 6B, and 7A and 7B. These signaling diagrams depict that an enterprise communications platform 18 can be involved in establishing calls involving mobile device 11. Such call establishment, can include, for example, that the enterprise communications platform can establish a voice call, from PBX 16 to a called party device, on behalf of device 11. Such call establishment also can include that PBX 16 can be made to call device 11 for establishing such voice calls. These example methods thus relate to approaching to verifying whether a call incoming to device 11 is from enterprise communications platform 18, or not.

By particular example, if device 11 indicates to the enterprise communications platform 18 that the platform 18 should call it, in order to establish a call with a called party, then there will be a delay between when device 11 signals platform 18 and when the call from platform 18 arrives at device 11. During that timeframe, device 11 may receive a call from an entirely different party (e.g., a call from a friend). Such calls should not disrupt the setup of the call already in progress. These methods also provide for handling situations where caller ID or Automatic Number Identification (ANI) information is not available to device 11 for an incoming call. These methods depict a variety of steps, and logical decision points. Based on these examples, persons of ordinary skill in the art may provide equivalent formulations that have a different set of or a ordering of logical decision points, to arrive at the same or similar result.

Now turning to FIG. 11, an example relating to device 11 signalling platform 18 to place a call is depicted and described. FIG. 11 relates generally to the signaling diagram of FIG. 6B, as explained below. Device 11 can send (1102) an indication to platform 18 to establish an outgoing call for it, over the data channel (corresponding to signaling 120).

Device 11 waits (1104) for confirmation (signaling 122), and if such confirmation is not received (e.g., not within a prescribed time limit), then the call fails (1114). If there is reception of the confirmation, then device 11 waits (1106) for a callback (e.g., call 126) for Y seconds; if there is no callback within the prescribed time limit (such as, for example, 30 seconds), then the call fails (1114). Such wait time can be adjusted based on observed behavior and other sources of empirical data about how networks used a given device behave, as well as behavior of a given device or class of devices. Such wait periods also can be adjusted based on user preferences.

If there is a callback, then device 11 attempts to obtain or otherwise sample any available ANI information (1110) for that call. If the ANI information obtained (if any) matches ANI information expected (e.g., based on configuration information provided with the mobile device, such as one or more telephone numbers, or received with the confirmation), then the call is answered, and a verification code is sent, after a waiting period (1108). Thereafter, the call can proceed (e.g., the microphone and speaker of device 11 can be activated, thereby allowing a user to send and receive voice information).

However, if there was no ANI information with the callback, the call can still be answered, and the verification code provided (separating depicted as step 1116). Device 11 waits (example maximum wait time of 3.5 seconds) to receive, over the voice channel established by answering the callback, a verification code. If no verification code is received within the time limit or an incorrect verification code is received, then the call is rejected (1120). If a valid verification code is received (1118), then the call is allowed to proceed (1122).

If there was ANI information present (1112), but it did not match (1110), then the call also is rejected (1120).

The wait time, after the callback is answered (1108/1116), can be about 300 milliseconds for GSM devices, and about 1 second for CDMA devices. The wait time is additional time provided for allowing the voice channel to be ready to transmit and/or receive tones composing the verification code. These times can be adjusted based on observed/empirically-determined delays in networks used by a given device, or a given collection of devices. These times also can be adjusted based on delays observed for different kinds and models of devices that may be used. Such delays can be constant among devices, or they can be made device-specific. As such, the delay timing here is provided as an example.

In preferred examples, the verification code comprises a sequence of Dual Tone MultiFrequency (DTMF) tones. In one preferred example, the verification code comprises any of the tones formed by combining a 1633 Hz tone with tones of frequencies 697, 770, 852, or 941 Hz (which respectively are tones A, B, C, and D on a full 16 digit DTMF keypad). Where such A, B, C, or D tones are not supported by a given device or network (for example, some CDMA networks may not support such tones), then other DTMF tones can be used, such as those tones associated with the digits 0-9 on a normal touch tone keypad.

FIG. 12 depicts an example method for determining whether a call incoming to mobile device 11 is from enterprise communications platform 18 or is an ordinary incoming call. The depicted method shows that a cell call can be received (1202) (e.g., signaling indicative of such a call can be received) by device 11. There is a determination whether a data notification from enterprise communications platform 18 is received (1204), and if received (1204), there is a determination as to whether the ANI for the incoming call is either empty or matches (1206) to an expected ANI for the enterprise communications platform 18 (e.g., for PBX 16). If there is a match or the ANI is empty, then the call is shown as an enterprise call on a user interface, and a verification code is sent, after a wait time (1208) (e.g., 300 ms or 1 second, depending on device 11). Thereafter, the call can proceed (1228). However, if there was no ANI or the ANI did not match what was expected, then the call is rejected (1210).

If there was no notification received (1204), and the ANI did not match what was expected (1212), and the mismatch results from an empty ANI (ANI was not obtained and did not match) (1214), then the call can be shown as an unknown cell call initiated through the enterprise platform, and a verification code is sent (1218) after a waiting period. Subsequently, if responsive valid verification code is received (1222), the UI can be switched (1224) to show an enterprise call, and the call can proceed (1228). If the verification code is not received (or is invalid), then the UI can be shown as a regular cell call, and the user can be provided an opportunity to answer or ignore the call (1226).

If the ANI did not match (1212) and yet was not empty (i.e., ANI information was captured for the call, but did not match ANI expected for an enterprise call), then the call can be displayed as a cell phone (or a call other than an enterprise call, and a verification code will not be sent upon answering the call. As such, in this part of the method depicted in FIG. 12, there is enough information known about the call to determine that it is not an enterprise call, and the call can instead be treated similarly to a regular incoming call.

In the foregoing, separate boxes or illustrated separation of functional elements of illustrated systems does not necessarily require physical separation of such functions, as communications between such elements can occur by way of messaging, function calls, shared memory space, and so on, without any such physical separation. As such, functions need not be implemented in physically or logically separated platforms, although they are illustrated separately for ease of explanation herein.

For example, different embodiments of devices can provide some functions in an operating system installation that are provided at an application layer or in a middle layer in other devices. Different devices can have different designs, such that while some devices implement some functions in fixed function hardware, other devices can implement such functions in a programmable processor with code obtained from a computer readable medium.

Further, some aspects may be disclosed with respect to only certain examples. However, such disclosures are not to be implied as requiring that such aspects be used only in embodiments according to such examples. Variables X and Y were used to indicate time delays. Where such variables are used, empirically determined timings can be used. Reuse of the variable X does not necessarily imply that the time associated with each usage of that variable is the same.

The above description occasionally describes relative timing of events, signals, actions, and the like as occurring "when" another event, signal, action, or the like happens. Such description is not to be construed as requiring a concurrency or any absolute timing, unless otherwise indicated.

Certain adaptations and modifications of the described embodiments can be made. Aspects that can be applied to various embodiments may have been described with respect to only a portion of those embodiments, for sake of clarity. However, it is to be understood that these aspects can be provided in or applied to other embodiments as well. Therefore, the above discussed embodiments are considered to be illustrative and not restrictive.

The invention claimed is:

1. A method comprising:
receiving a call on a communications device;
answering the received call;
sending over a first channel, an indication to bridge the received call to a called party device using a third-party control architecture, and waiting to receive a confirmation of reception of the indication via a communications server;
beginning a timeout period, during which bridging of the received call occurs, or indicating on the communications device that the bridging has failed, occurs; and
conditioning the beginning of the timeout period on reception of a confirmation, over a second channel, that the indication was received, and in the absence of such confirmation over the second channel, proceeding to indicate that bridging the received call to the called party device has failed.

2. The method of claim 1, further comprising determining whether a notification of the received call was received over a channel at the communications device, and if the notification was received, rejecting the received call when identifying information for the received call is available but does not match stored identifying information for a server.

3. The method of claim 1, further comprising determining whether a notification of the received call was received over a channel at the communications device, and if the notification was not received, and when identifying information for the received call is available and matches stored identifying information for a server, then allowing the received call to proceed within the timeout period.

4. The method of claim 1, further comprising determining whether a notification of the received call was received over a channel at the communications device, and if the notification was not received, and when identifying information for the received call is available and does not match stored identifying information for a server, then presenting an option on a user interface to accept the received call.

5. The method of claim 1, wherein if a reply verification code is not received over the channel within the timeout period, then the method further comprises presenting an option on a user interface to accept the received call.

6. The method of claim 1, further comprising updating a user interface to indicate that the received call is from an enterprise server when a notification of the received call was received over a channel at the communications device and when identifying information for the received call is available and matches stored identifying information for the enterprise server.

7. The method of claim 1 wherein the communications device is configured to operate in compliance with a GSM protocol.

8. The method of claim 1 wherein the communications device is configured to operate in compliance with a GPRS protocol.

9. The method of claim 1 wherein the communications device is configured to operate in compliance with an EDGE protocol.

10. The method of claim 1, wherein the timeout period is 300 milliseconds for a Global Systems for Mobile Communications (GSM) communications device and one second for a Code Division Multiple Access (CMDA)-based communications device.

11. A non-transitory computer readable medium storing executable instructions to perform a method, comprising:
receiving a call on a communications device;
answering the received call;

sending over a first channel, an indication to bridge the received call to a called party device using a third-party control architecture, and waiting to receive a confirmation of reception of the indication via a communications server;

beginning a timeout period, during which bridging of the received call occurs, or indicating on the communications device that the bridging has failed, occurs; and conditioning the beginning of the timeout period on reception of a confirmation, over a second channel, that the indication was received, and in the absence of such confirmation over the second channel, proceeding to indicate that bridging the received call to the called party device has failed.

12. The non-transitory computer readable medium of claim 11, wherein the method further comprises determining whether a notification of the received call was received over a channel at the communications device, and if the notification was received, rejecting the received call when identifying information for the received call is available but does not match stored identifying information for a server.

13. The non-transitory computer readable medium of claim 11, wherein the method further comprises determining whether a notification of the received call was received over a channel at the communications device, and if the notification was not received, and when identifying information for the received call is available and does not match stored identifying information for a server, then presenting an option on a user interface to accept the received call.

14. The non-transitory computer readable medium of claim 11, wherein the method further comprises updating a user interface to indicate that the received call is from an enterprise server, responsive to receiving, at the communications device, a verification code over the channel within the timeout period.

15. A communications device, comprising:
a channel interface;
a processor module; and
a computer readable medium storing computer executable instructions for programming the processor module to perform a method, comprising:
receiving a call on a communications device;
answering the received call;
sending over a first channel, an indication to bridge the received call to a called party device using a third-party control architecture, and waiting to receive a confirmation of reception of the indication via a communications server;

beginning a timeout period, during which bridging of the received call occurs, or indicating on the communications device that the bridging has failed, occurs; and conditioning the beginning of the timeout period on reception of a confirmation, over a second channel, that the indication was received, and in the absence of such confirmation over the second channel, proceeding to indicate that bridging the received call to the called party device has failed.

16. The communications device of claim 15, wherein the timeout period is 300 milliseconds for a Global Systems for Mobile Communications (GSM) communications device and one second for a Code Division Multiple Access (CMDA)-based communications device.

17. The communications device of claim 15, wherein the method further comprises determining whether a notification of the received call was received over a channel at the communications device, and if the notification was received, rejecting the received call when identifying information for the received call is available but does not match stored identifying information for a server.

18. The communications device of claim 15, wherein the method further comprises determining whether a notification of the received call was received over a channel at the communications device, and if the notification was not received, and when identifying information for the received call is available and matches stored identifying information for a server, then sending a verification code over the channel and allowing the received call to proceed.

19. The communications device of claim 15, wherein the method further comprises determining whether a notification of the received call was received over a channel at the communications device, and if the notification was not received, and when identifying information for the received call is available and does not match stored identifying information for a server, then presenting an option on a user interface to accept the received call.

* * * * *